Dec. 22, 1964     A. W. HAYDON     3,162,798
OSCILLATING MAGNET TO GOVERN MOTOR SPEED
Filed Sept. 6, 1962     2 Sheets-Sheet 1

INVENTOR.
ARTHUR W. HAYDON
BY
*Mandeville & Schweitzer*
ATTORNEYS

Dec. 22, 1964  A. W. HAYDON  3,162,798
OSCILLATING MAGNET TO GOVERN MOTOR SPEED
Filed Sept. 6, 1962                                           2 Sheets-Sheet 2

INVENTOR
ARTHUR W. HAYDON
BY
*Mandeville & Schweitzer*
ATTORNEYS

United States Patent Office

3,162,798
Patented Dec. 22, 1964

3,162,798
OSCILLATING MAGNET TO GOVERN
MOTOR SPEED
Arthur W. Haydon, Milford, Conn., assignor to Consolidated Electronics Industries Corp., Waterbury, Conn., a corporation of Delaware
Filed Sept. 6, 1962, Ser. No. 221,744
12 Claims. (Cl. 318—302)

The present invention relates to a speed governor for a rotating device, and more particularly to an improved and simplified magneto-mechanically coupled governor and miniature electric motor combination adapted to operate at a predetermined avarage speed.

The governor of the present invention essentially comprises complementary, relatively oscillating and rotating members. It includes a mechanical constant speed device, advantageously having a predetermined natural frequency corresponding to the desired predetermined speed of the motor, which controls the period of the oscillating member, usually in the form of a notched pallet lever. A magnetized "governing" cone is carried by the oscillating pallet lever and cooperates in a novel manner with the rotating member, a magnetized star wheel flexibly coupled to the motor shaft, to regulate the average speed of the motor. Alternately staggered about the central plane of rotation of the star wheel are a plurality of magnetized, conical spokes, each of generally the same proportion and dimension as the governing cone.

In accordance with the invention, the orbital paths of rotation defined by the "governed" spokes of the star wheel are intersected by the path of oscillation of the governing cone. The governing cone and the governed conical spokes are advantageously of the same magnetic polarity, causing a mutual repulsion of the governing cone and the conical star wheel spokes, which repulsion affords a non-mechanical, frictionless, magnetic coupling of the two elements. Thus when the oscillated governing cone moves into the orbit of a rotating spoke it interferes therewith and temporarily impedes or magnetically locks the star wheel's rotation. There is no physical contact of the governing cone with the spoke owing to the repulsion effect of the magnetic coupling. When the governing cone is oscillated out of the magnetically interfering relation, the governed spoke is released or unlocked, enabling the star wheel to rotate under the urging of the motor until the oscillating cone magnetically interferes with and locks the next successive advancing spoke.

Advantageously, the star wheel is coupled to the shaft of a motor to be governed by means of a second hair spring to complete the magneto-mechanical coupling of the governor with the motor. Essentially, the second hair spring comprises a flexible, mechanical coupling between the governed star wheel spokes and the motor shaft which functions to even out or smooth the motor shaft output relative to the uneven, start and stop, motion of the governed spokes. Thus, the intermittent rotation of the star wheel is used to control the average speed of the continuously rotating motor shaft, the differences in relative motions therebetween advantageously being accommodated by the flexible hair spring coupling.

In accordance with the present invention, the star wheel tends to be driven at a speed tending to be in excess of the value of the deisred, predetermined "governed" speed by a motor having a power supply tending to accelerate the motor above its governed speed, under normal operating conditions. The governing cone acts upon the star wheel as a brake to reduce its speed and correspondingly to reduce the motor shaft speed through the mechanical hair spring coupling of the motor shaft with the star wheel. Thus the mechanism embodying the concepts of the invention may descriptively be categorized as a stall-torque governor. The predetermined desired average motor speed is attained during the operation of the mechanism through the counterbalancing effects of the accelerating tendencies of the motor and the decelerating or braking tendencies of the governing cone. The motor, in effect, is constantly hunting the predetermined, desired speed level, which corresponds to the natural frequency of the mechanical constant speed device.

In a preferred embodiment of the present invention, a balance wheel and hair spring combination is employed as a reliably self-starting constant speed device. The balance wheel, which also includes an impulse pin integral therewith, derives its energy intermittently through the periodic impulsing of the impulse pin by the notched pallet lever. The magnetic locking and unlocking of the cone provides sufficient energy, derived from the motor, to pulse the pallet lever and thereby to maintain the constant oscillation of the balance wheel. Advantageously, the amplitude of oscillation excursions of the governing cone are limited by a pair of banking elements to a predetermined amplitude.

The star wheel's staggered spokes will tend to rotate intermittently through the path of oscillation defined by the governing cone with their average angular velocity synchronized with the rate of oscillation of the governing cone. During normal operation, the balance wheel will continue to oscillate at its constant, natural speed, determined by the combination of its own inertia and the hair spring characteristics, regardless of the changes of instantaneous speed of the motor. The governor is therefore capable of maintaining the average speed of the motor shaft constant and substantially proportional to the frequency of oscillation of the balance wheel-hairspring combination. During abnormal operation (such as startup) in the event the timing of the rotation of the star wheel is not properly synchronized with the timing of the frequency of oscillation of the governing cone, the staggered relation of the spokes of the star wheel will cause actual mechanical interference with and be mechanically locked by the governing cone to prevent runaway of the motor.

Generally, the governed motor will be a miniature D.C. motor governed to operate at well below its no load speed but, where appropriate, it may be a miniature synchronous motor governed to operate below its synchronous speed. Extremely high accuracy, in the order of ±0.1% variance from the desired average speed, is attainable.

The magneto-mechanically coupled governor of the present invention advantageously governs the speed of an electric motor without the necessity of opening and closing electrical contacts and without electrical circuitry of any nature. It has been found to be extremely well adapted for miniature motors. The magnetic coupling of a governing cone and governed star wheel, in accordance with the principles of the invention, eliminates the wearing of parts and affords silent operation of the governor. Furthermore, the mechanical hair spring coupling of the star wheel and the motor shaft accommodates relative displacements therebetween during normal operation and cooperates with the mechanically frictionless, magnetic coupling of the star wheel and the governing cone to provide for smooth operation of the governed motor with minimum instantaneous variations from the desired, average speed.

For a better understanding of the invention, reference may be made to the following description and accompanying drawings, in which.

Figure 1:
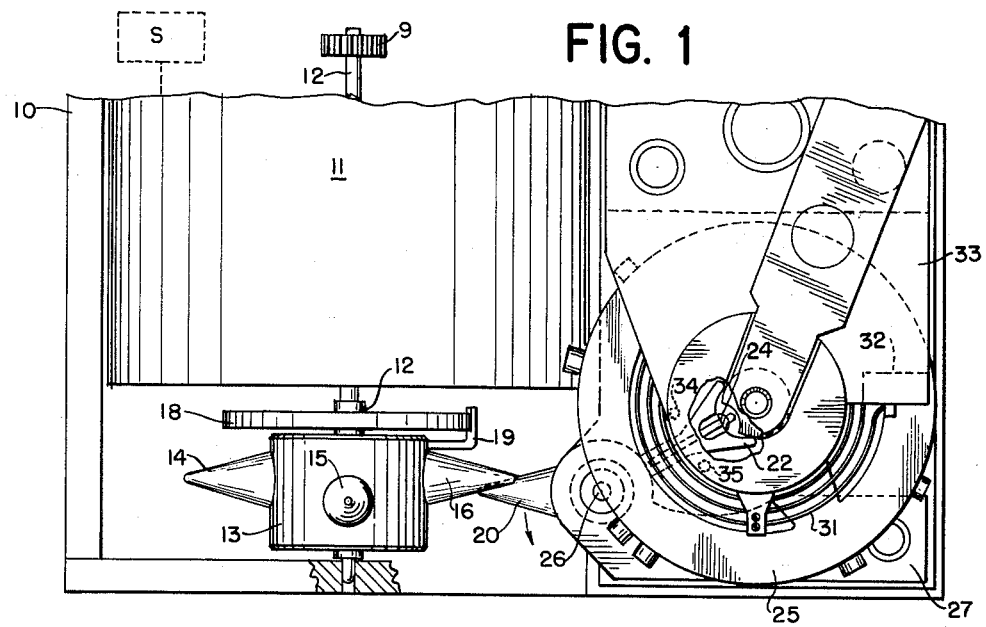
FIG. 1 is a plan view of a motor speed governor device constructed in accordance with the present invention with parts of the housing broken away to show details of construction and the relationship of the elements with governing cone midway between the limits of its excursion.

Referring to the drawings, in FIG. 1 the numeral 10 designates a casing or housing for the new motor-governor combination. A miniature electric motor 11, having projecting longitudinal rotor shaft 12 with a driving pinion 9 thereon, is secured within the housing by suitable means. A star wheel 13, having four conical magnetized spokes 14-17, advantageously of ferrite material, is loosely mounted on the shaft 12. The star wheel is mechanically coupled with the shaft by a coiled hairspring coupling 18 which is connected at one free end 18a to the shaft and at the other free end 18b to an arm 19 extending from the star wheel.

Figure 3:
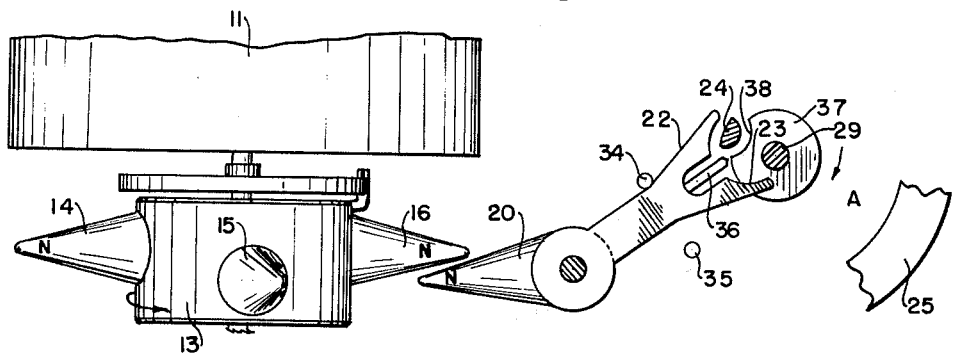
FIGS. 3-5 are enlarged, plan views of the governor mechanism of FIG. 1 showing the full excursion of the governing cone and its relationship with the star wheel spokes.
Figure 4:
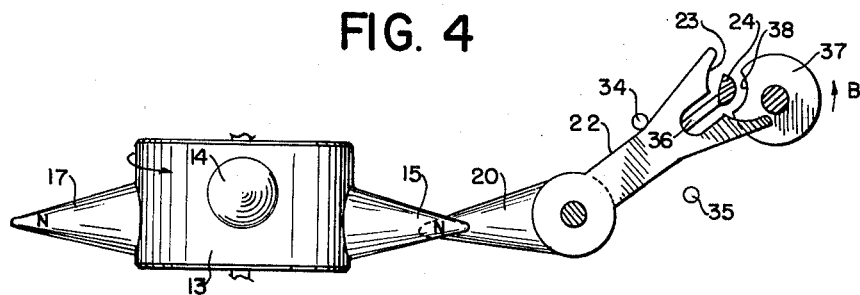
Figure 5:
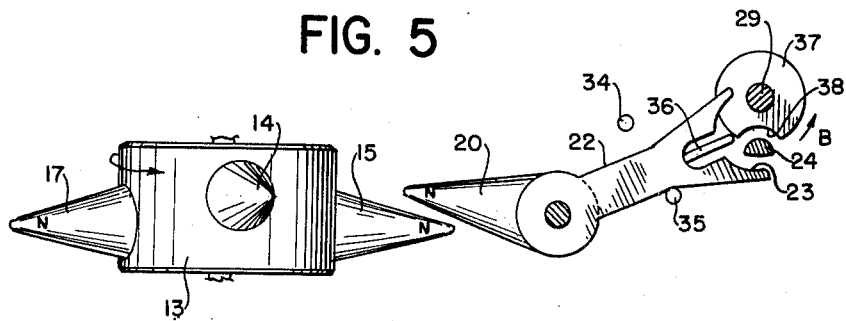

As may be seen clearly in FIGS. 3-5, the spokes are alternately staggered along opposite sides of the horizontal axis so that the spokes 14, 16 are closer to the motor than the spokes 15 and 17. When the star wheel revolves, the spokes 14 and 16 define a first orbital path, while the spokes 15 and 17 define a second orbital path parallel to the first and separated axially therefrom by a predetermined distance.

Figure 2:
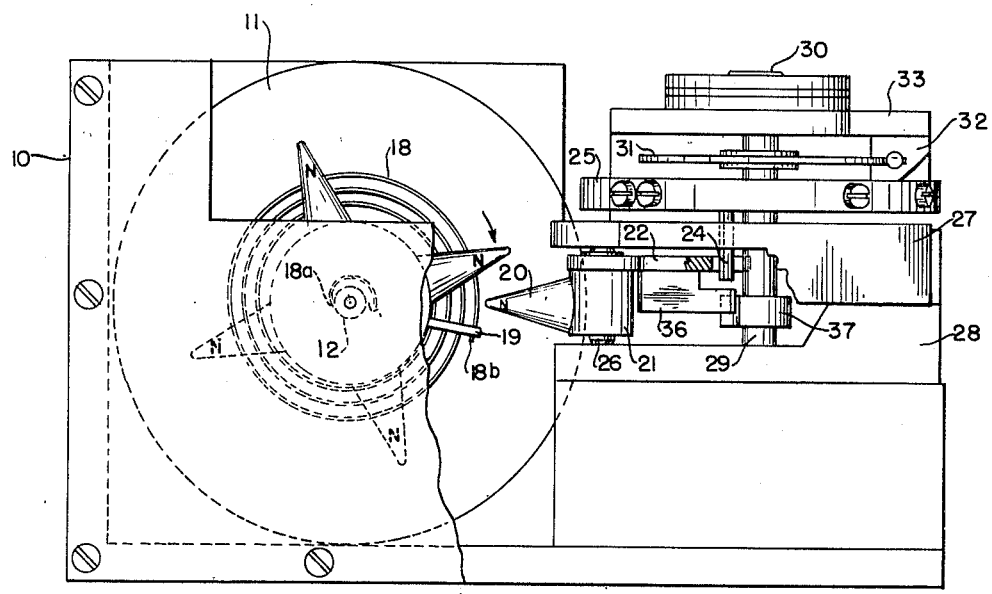
FIG. 2 is an end view of the mechanism of FIG. 1 with the governing cone in the same central position.

A magnetized governing cone 20, advantageously of ferrite material, is mounted in a hub 21 which is carried by a pallet lever 22. The governing cone 20 and the governed spokes 14-17 are of the same magnetic polarity, for example north as shown in the drawings, to create a mutual repulsion therebetween. The lever 22 has a notch 23 which is adapted to cooperate periodically with an impulse pin 24 mounted on a balance wheel 25. As best seen in FIG. 2, both the hub 21 and the pallet lever 22 form a single oscillating element which periodically pivots about a shaft 26, supported by a pallet bridge 27 and by a governor plate 28. The limits of the pallet lever's excursion are set by a pair of banking pins 34, 35.

In the illustrated preferred embodiment of the invention, the constant speed device comprises the balance wheel 25, supported for rotation by a balance staff 29 and mounted in a pair of bearings 30 (only one of which is shown), and a coiled hairspring 31 which is fastened at one end to the balance wheel and at its other end to a fixed post 32 carried by the balance bridge 33. In accordance with well known principles, the characteristics of the balance wheel 25 and hairspring 31 will cause the balance wheel 25 to oscillate at a predetermined frequency once it is set in motion.

As shown in FIGS. 3-5, a safety arm 36 is fixed to the lever 22 and extends into close proximity to a locking disc 37 fixed to the balance staff 29 carrying the balance wheel 25. The locking disc 37 has a cutaway portion 38 which accommodates the movement of the safety arm 36 as the balance wheel lever 22 oscillates from one extreme position to the other.

During normal operation, the safety arm 36 does not touch the locking disc 37 at any time. Thus, when the lever 22 is held against the magnetic banking pins 34, 35, as shown in FIGS. 3-5, the safety arm 36 is out of engagement with the disc 37 and, when the lever 22 swings from one extreme position to the other, the safety arm 36 registers with the cutaway portion 38 of the locking disc without touching, as illustrated in FIG. 4. The safety arm and locking disc, however, prevent accidental displacement of the pallet lever 22 which might otherwise occur when the governor mechanism is subjected to severe vibration or shock.

As will be understood, the mechanical constant speed device derives its energy through the impulsing of the impulse pin 24 by the pallet lever 22, which itself is energized through the magnetic locking and unlocking of the star wheel spokes 14-17 by the governing cone, as will be described in greater detail hereinafter.

In accordance with the principles of this invention, the electric motor 11 is arranged to be connected to an electrical power supply "S" which tends to cause the motor to accelerate to a speed in excess of the predetermined desired average speed. A D.C. motor running well below no-load speed (or, in appropriate cases, a synchronous motor operating well below synchronous speed) will advantageously meet this requirement.

The governing cone 20 is adjusted to oscillate at a fixed period determined by natural frequency of the constant speed device. As clearly indicated in FIGS. 3-5, the amplitude of the oscillations of the tip of the governing cone 20 is advantageously substantially equivalent to the distance between the first and second orbits of the revolving star wheel spokes and is limited by the pair of banking pins 34, 35. As may be further seen in FIGS. 3-5, the path of oscillation of the cone intercepts the first orbital path of spokes 14, 16 at one of its extremities and the second orbital path of spokes 15, 17 at its other.

In actual operation, the star wheel 13 tends to be driven by the rotor shaft 12 through the spring coupling 18 at a speed in excess of the predetermined desired value. The star wheel is decelerated or braked and the electric motor is thereby decelerated, by interference of the governing cone 20 with the star wheel to give the star wheel a resultant average speed equivalent to the predetermined desired value set by the natural frequency of the constant speed device.

The apparatus illustrated in FIGS. 1 and 2 is reliably self-starting. Thus, with the mechanism inoperative, the elements invariably come to a rest in the central position with the notched pallet lever 22 midway between the limits of its excursion, banking pins 34, 35, and with the impulse pin 24 in the center of the notch 23. When the motor 11 is energized, rotation of the rotor shaft 12 will cause the star wheel to rotate in a clockwise direction, for example, it being understood, however, that the mechanism disclosed herein is bi-directional and will operate equally as well for counterclockwise rotation. In turn, the star wheel's movement under the primary influence of the motor 11 and the secondary influence of the hairspring 18, will cause pivoting force to be frictionlessly transmitted to the governing cone through mutual magnetic repulsion. The energy derived through the magnetic unlocking, on each occasion, is imparted by the pallet lever to the impulse pin 24 to cause the balance wheel 25 to move in the direction indicated by the arrow A in FIG. 3. The lever's excursion is limited by banking pin 34 while the impulse pin 24 continues to rotate in direction A to its extreme position.

As an accelerating spoke, No. 15 for example, approaches the governing cone 20, the following occurs. The governing cone 20, having been moved into an extreme position by the lever 22 which is held at the extreme of its excursion by the banking pin 34, will intercept and magnetically restrain the advancing spoke 15 through mutual magnetic repulsion and thereby impede the rotation of and normally stall the star wheel as shown in FIG. 4. Thereafter, at a predetermined instant in the cycle of the balance wheel, the lever will be moved off the banking pin 34, toward its opposite extreme position, by the action of the impulse pin 24 as it returns in a direction indicated by the arrow B to re-enter the notch 23 and strike the pallet lever. This unlocks the spoke 15 and frees it for further rotation. During each magnetic unlocking of the spokes 14-17 by the governing cone 20, the magnetic repulsion of the star wheel and the governing cone provides a uniform energy impulse of sufficient magnitude to the impulse pin 24, while it is in the notch 23, to keep the balance wheel 25 oscillating at the desired frequency.

The contemplated applications of the mechanism of the invention require that the output of the motor 11, delivered through the driving pinion 9 be continuous and of substantially constant speed. Thus, an extremely important aspect of the present invention is the mechanical hairspring coupling 18 which connects the star wheel 13 to the rotor shaft 12 to complete the magneto-mechanical coupling of the governor with the motor. The hairspring coupling 18 accommodates the relative motion between the intermittently rotating star wheel 13 and the continuously rotating rotor shaft 12, whose speed is controlled thereby. The overall effect, of the flexible mechanical coupling of the star wheel 13 to the shaft 12 and the magnetic coupling of the star wheel 13 to the governing cone 20, is to provide a smooth, substantially constant motor output at the driving pinion 9.

Once unlocked, the star wheel rapidly accelerates under the influence of the tensioned coupling spring 18, but its rotation will again be impeded by the interception of the next advancing spoke 14 by the governing cone 20, which by that time has moved to the other end of its oscillating path by the lever 22 now held against the banking pin 35. The spoke 14 is then unlocked when the movement of the governing cone 20 toward its opposite limit position is initiated by the return of the impulse pin 24 in direction A. The process continues cyclically with the balance wheel being repeatedly energized by the pallet lever through energy derived from the magnetic unlocking of the governing cone and a star wheel spoke.

Thus, in each complete revolution of the rotor shaft 12 there are four period of acceleration (upon unlocking) and deceleration (upon locking) which, when combined, determine the average value of shaft speed. As will be understood, the average shaft speed is a direct function of the natural frequency of the constant speed device.

The magneto-mechanically coupled stall-torque governor described hereinabove has great utility in the controlling of miniature, low power motors. Furthermore, a motor-governor combination, made in accordance with the principles of the invention, operates very reliably and at a high efficiency.

Long life and smooth operation is insured by the unique magneto-mechanical coupling, which allows greater tolerances in manufacture and assembly in addition to accommodating stall-torque governing without any mechanical contact. Use of the motor-governor combination of the present invention advantageously eliminates the need for governing circuitry or constantly opening and closing electrical contacts. Thus it will be understood that the magneto-mechanically coupled motor-governor combination of the present invention provides an economically and simply manufactured governor, which reliably, efficiently, and accurately controls the speed of a low power motor to a predetermined desired value.

Although the present invention has been described with reference to a specific, preferred embodiment, it should be understood that the disclosure has been made only by way of example and that certain changes in details of construction and arrangement of elements may be made without departing from the spirit and scope of the invention as hereinafter claimed.

I claim:

1. A governor for an electric motor tending to operate at a speed above a predetermined desired speed comprising
   (a) a constant speed reference device having a natural frequency substantially corresponding to said predetermined desired speed,
   (b) an oscillating governing element periodically influenced by said constant speed device, the period of said element being regulated by said constant speed device,
   (c) said governing element having an active portion of a predetermined magnetic polarity,
   (d) said active portion having a predetermined path of oscillation,
   (e) a star wheel having a plurality of projecting spokes magnetized to said predetermined polarity, thereby creating a mutual magnetic repulsion between ends of said spokes and said cone, and
   (f) a coiled hairspring fixed at one of its ends to the motor shaft and at its other end to said star wheel, forming a flexible mechanical coupling of said wheel with said motor,
   (g) said star wheel being adapted to be rotated by said motor whereby its revolving spokes define a predetermined orbital path,
   (h) said orbital path being intersected by said path of oscillation,
   (i) said governing element being periodically moved in absence of mechanical contact into and out of said orbital path by the combined influences of the constant speed device and the magnetic repulsion between said star wheel spokes and said cone,
   (j) said cone, when in said orbital path, impeding the rotation of said spokes and thereby periodically decelerating said star wheel to an instantaneous speed less than the desired predetermined speed,
   (k) whereby the average speeds of said motor and said constant speed device are maintained in corresponding relation.

2. The motor-governor combination of claim 1 in which
   (a) said governing element is of generally conical configuration, and
   (b) each of said spokes of said star wheel is of similar conical shape and size to said governing element.

3. The motor governor combination of claim 1, in which
   (a) said star wheel is provided with an even number of spokes,
   (b) said spokes are alternately disposed on opposite sides of a predetermined central plane of said wheel, and
   (c) said spokes define two parallel orbital paths separated from one another by a predetermined distance.

4. The motor-governor combination of claim 3, in which
   (a) the amplitude of said oscillations of said governing element is substantially equal to said predetermined distance between said orbital paths.

5. The motor-governor combination of claim 1 in which
   (a) the constant speed device comprises a balance wheel and hairspring combination.

6. A governor for an electric motor tending to operate at a speed above a predetermined desired speed, comprising
   (a) a balance wheel and hairspring combination having a natural frequency corresponding to that predetermined desired speed,
   (b) a pallet lever operatively associated with said balance wheel and periodically influenced thereby,
   (c) a magnetic governing element carried by said pallet lever and defining a predetermined path of oscillation, and
   (d) a star wheel operatively associated with the shaft of said motor,
   (e) said star wheel having a plurality of spokes magnetized to the polarity of said governing element,
   (f) said spokes defining a predetermined orbital path,
   (g) said orbital path being intersected by said path of oscillation, and
   (h) said governing element being periodically moved into and out of said orbital path to impede periodically and magnetically, without mechanical contact, the rotation of said spokes, thereby slowing the rotor to an instantaneous speed less than the desired predetermined speed, (i) whereby the average speeds of said motor and said constant speed device are maintained in corresponding relation.

7. The motor-governor combination of claim 6, in which
   (a) said governing element is of generally conical configuration, and
   (b) each of said spokes of said star wheel is conically shaped and sized similarly to said governing element.

8. The motor-governor combination of claim 6 in which
   (a) said star wheel is provided with an even number of spokes,
   (b) said spokes are alternately disposed about the central plane of rotation of said wheel, and
   (c) said spokes define two parallel orbital paths separated by a predetermined distance.

9. The motor-governor combination of claim 6 which includes
   (a) resilient means operatively associated with the shaft of said motor to reduce the speed variations of the motor output relative to the speed variations of said star wheel.

10. The motor-governor combination of claim 6 which includes
    (a) a flexible hairspring coupling connecting said star wheel and the motor shaft.

11. A motor-governor combination comprising
    (a) a motor having an output shaft,
    (b) a power source for said motor arranged to drive said motor at a speed higher than a predetermined desired speed under normal operating conditions,
    (c) an oscillating constant speed system having magnetic governing means reciprocating in a predetermined path, and
    (d) a magnetic element associated with said output shaft and rotated thereby in a predetermined orbital path, which orbital path is intersected by the predetermined path of said governing means,
    (e) said magnetic element having a first operative condition in which rotation of said output shaft is magnetically impeded by said governing means and a second operative condition in which rotation of said output shaft is substantially unimpeded by said governing means.

12. A motor-governor combination comprising
    (a) a motor having an output shaft,
    (b) a power source for said motor arranged to drive said motor at a speed higher than a predetermined desired speed and under normal operating conditions,
    (c) an oscillating constant speed system,
    (d) cooperating magnetic elements associated with said output shaft and with said constant speed system.
    (e) said cooperating magnetic elements having a first operative condition in which rotation of said output shaft is magnetically impeded and a second operative condition in which rotation of said output shaft is substantially unimpeded,
    (f) said cooperating magnetic elements include a rotatable magnetic element driven by said output shaft, and
    (g) resilient means are provided to form a drive connection between said rotatable magnetic element and said output shaft, whereby the instantaneous speed variations of said output shaft are reduced relative to the instantaneous speed variations in said rotatable magnetic element.

References Cited in the file of this patent
UNITED STATES PATENTS

| | | |
|---|---|---|
| 1,907,531 | Fitz Gerald et al. | May 9, 1933 |
| 2,898,537 | Cluwen | Aug. 4, 1959 |